United States Patent
Marantier

[15] 3,698,148
[45] Oct. 17, 1972

[54] PANEL MOUNTING MEANS AND METHOD

[72] Inventor: Bernard Marantier, 18, Avenue du General Leclerc, 92 Boulogne-sur-Seine, France

[22] Filed: Dec. 7, 1970

[21] Appl. No.: 95,719

[30] Foreign Application Priority Data

Dec. 8, 1969 France..................6942402

[52] U.S. Cl. ....................52/400, 52/498, 52/616
[51] Int. Cl. ..........E06b 1/68, E06b 3/60, E06b 3/62
[58] Field of Search.....................52/397–403, 304, 52/616, 317, 501, 502, 494–502, 517

[56] References Cited

UNITED STATES PATENTS 3,233,381  2/1966  Von Wedel...............52/403

FOREIGN PATENTS OR APPLICATIONS 641,906  7/1962  Italy..........................52/397

*Primary Examiner*—Frank L. Abbott
*Assistant Examiner*—James L. Ridgill, Jr.
*Attorney*—Lawrence E. Laubscher

[57] ABSTRACT

Apparatus for mounting panel means of the mirror or window pane type within an opening contained in a support, characterized by the provision of a plurality of retaining means arranged in spaced relation about the periphery of said panel means, said retaining means being dimensioned to engage only a fraction of the peripheral edge portion of said panel means, in combination with seal means for sealing the entire peripheral space between the exterior face of said panel means and said support. In the preferred embodiment, the retaining means and the lower portion of said seal means extend within a common groove contained in the support, while in a second embodiment, they extend within separate spaced parallel grooves. According to a third embodiment, the seal means are integral with a cover member that also covers the retainer members and is adapted to engage the internal face of the panel means.

9 Claims, 5 Drawing Figures

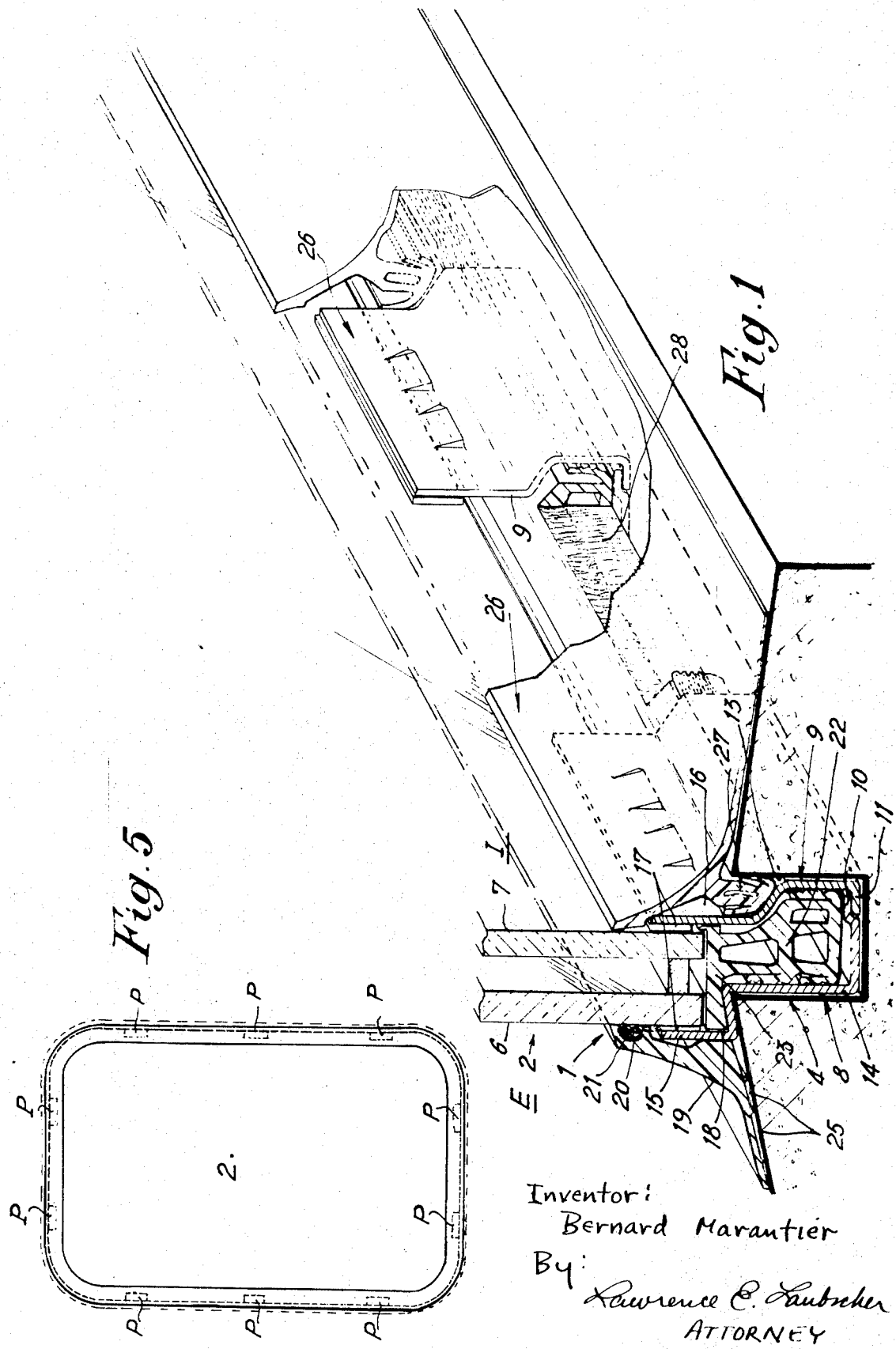

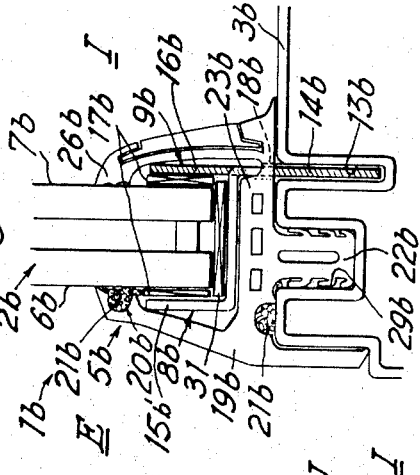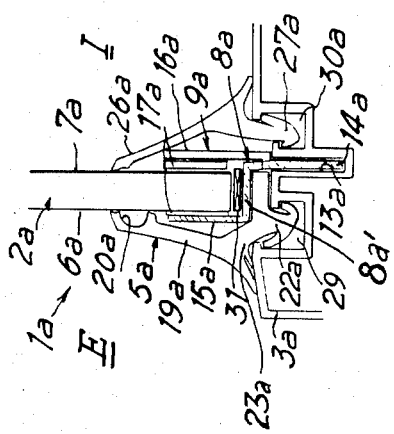

PANEL MOUNTING MEANS AND METHOD

This invention relates to devices for attaching panel means, especially a mirror or a window pane, to a support, comprising mechanical means for retaining the panel means in the support, and a sealing means made of elastomer material or a similar material for sealing the space between the exterior face of the panel means and the support.

The invention more particularly relates to attachment means for window panes or mirrors with relative large dimensions, which are mounted in a fixed position in openings situated in the facade or upper stories of very high buildings. It is known that such window panes or mirrors are subjected to mechanical stresses due essentially to the wind that are much greater than those to which the window panes or mirrors in the lower stories are subjected, since the average wind is stronger at an altitude than in the vicinity of the ground. Of course, these stresses depend on the exposure and the orientation of the frame means with respect to the wind, the geographical region, the season of the year, and the like. Devices for attaching said window panes or mirrors on the front of upper-level stories must thus simultaneously provide good sealing, especially against water, and good mechanical resistance to the appreciable forces to which the frame means are subjected. It has already been proposed, especially in the case of window panes or mirrors subjected to heavy mechanical stresses, that one might use a rigid frame attached to the support, generally made up of the walls of an embrasure made in the facade of a building. Toward the interior of the building, the frame involves an edge that serves as a stop. A sealing element, made of elastomer or synthetic plastic material, in the form of a framework, is arranged over the entire perimeter of the frame means, the rim portion of the frame means extending into a groove provided in the seal means. The panel means thus equipped is placed in the framework so that the face of the seal turned toward the inside of the building will come to abut against the edge of the frame. A tightening element is then screwed, from the outside, upon the frame so as to tighten the seal, over the entire perimeter of the mass, against the inside edge of the frame. On the one hand, this tightening guarantees the mechanical maintenance of the mass and, on the other hand, improves the seal between the panel means, the seal means and the frame.

However, it has been found that the tightness of the seal thus obtained was not entirely satisfactory, especially in the corners. This is why it was necessary to use a sealing product, such as cement, on the outside face of the mass. The sealing effect must thus be accomplished between said outside face and the frame because, in the case of panel means including two mirrors or window panes which are parallel and which are separated from each other by an air layer, any penetration of water between the two plates would lead to condensation of the faces of these elements that are in contact with the intermediate air layer. Due to this fact, the placement of cement can be accomplished only from the outside, with the frame means being immovable, in contrast to the window panes of conventional windows which may be opened.

Thus, most of the operations of placing and attaching the mass must be accomplished from the outside, which is impractical in the case of multi-storied buildings.

Furthermore, it is necessary to guarantee tightness between the frame and the wall of the opening which constitutes the support.

The invention is intended above all to offer an improvement over the aforementioned attachment means and thereby avoid the inherent drawbacks thereof.

A device for the attachment of a panel member, especially a mirror or a window pane, upon a support, according to the invention, includes mechanical means anchored in the support for retaining said panel means, and a sealing member made of elastomer or similar material, characterized in that, on the one hand, the mechanical retaining means are located at a plurality of spaced points on and cooperate with a fraction of the perimeter of the panel means and that, on the other hand, the sealing means is so made as to insulate the mechanical retention means from the medium that engages the external face of the panel means and to establish a tight seal directly between said face and the support.

Each mechanical retention means, located in a particular place, preferably includes a pair of exterior and interior retainer members designed to serve as lateral stops for the outside rim and the inside rim of the frame means, respectively, said retainer members cooperating with the support so as to transmit to the latter the retention efforts either directly or through the other retainer member.

The sealing means preferably includes a flexible upper portion which can be supported, on the one hand, against one of the faces of the panel means and, on the other hand, against the support that curves in and forms a tight connection between said face of the panel means and the support, said upper portion being so placed as to cover the tabs and to insulate them from the medium that touches said face of the panel.

The invention is also intended to offer a method for mounting the device described above, characterized by the fact that the panel means are attached to the support at a plurality of points by means of a portion of the retaining means, whereupon an exterior seal is inserted within the retention means, so that it will protect them. The mirror or pane is then placed in the support and the other portion of the retaining means is positioned against the mirror.

According to another feature involved in this method, cover means are subsequently placed in position on the interior side.

Apart from the features described above, the invention consists of certain other structural improvement which will now be described in a more detailed fashion with respect to the accompanying drawing, in which:

FIG. 1 shows a detailed perspective view of the preferred frame mounting means according to the invention;

FIG. 2 shows a detailed transverse cross-section of the bottom horizontal portion of the device of FIG. 1;

FIG. 3 and 4 show detailed transverse cross-section views of two alternate embodiments of the attachment means of the present invention; and FIG. 5 illustrates a front view, on a reduced scale, of a mirror mounted by the method according to the invention.

The attachment means 1 for mounting frame means 2, especially a mirror or a window pane, within an opening contained in a support 3 includes mechanical retaining means 4 and a sealing means 5 formed of an elastomer material or a similar sufficiently flexible and elastic material.

The panel means 2 represented in FIGS. 1 and 2 comprises a pair of parallel spaced mirrors or window panes assembled rigidly to define therebetween an intermediate air layer. Such panel means are currently used to guarantee good heat and/or sound insulation.

In the illustrated embodiment, the support 3 is made up of a wall of an embrasure formed in the facade of a building, arranged to define on either side of the frame means an exterior space E in contact with an exterior face 6 of the mass and an interior space I in contact with an interior face 7. It is quite obvious that the support 3 may comprise a door frame, a framework, or the like situated inside a building (for example, in a room with large dimensions, such as a motion picture auditorium or a conference room). In the latter case, the panel means 2 are located entirely inside a building but, by definition, the letter E will be used to indicate the medium touching the face 6, and the letter I to indicate the medium touching face 7.

In accordance with the invention, on the one hand, the mechanical retaining means 4 are arranged at several peripherally spaced locations and cooperate with a fraction of the perimeter of the mass 2 and, on the other hand, the sealing means 5 is so placed as to insulate the mechanical retaining means 4 from the medium E which touches the face 6 of panel means 2 and establishes a tight seal directly between said face 6 and the support 3.

The mechanical retention means 4 comprises a pair of exterior and interior retainer members 8 and 9, respectively, that are formed of metal and serve as lateral stops on the outside rim and the inside rim of the panel means 2, which members cooperate with the support 3 to transmit to the latter the retention efforts either directly or through the other member.

In the embodiment illustrated in FIGS. 1 and 2, the retainer member 8 is attached to the support 3 and includes a wing portion 10 that extends parallel to but slightly spaced from the face of support 3. The retainer member 9 includes a complementary wing portion 11 that is adapted for insertion between the wing 10 and the support 3. Retainer member 8 thus directly transmits the retention efforts to support 3 while retainer member 9 transmits the retention efforts to said support by means of retainer member 8. The latter is preferably attached to the support by means of nails 12 that are inserted with the help of a drill.

A groove 13 is provided in the support 3 for receiving at least a portion of the perimeter of the panel means 2. While the transverse cross-section of the groove 13, as shown in FIGS. 1 and 2, is rectangular, it is apparent that the cross-section may be of alternate configurations (such as dovetail or semi-dovetail configurations, not shown).

The exterior retainer member 8 includes a vertical portion 14 that extends downwardly in the groove 13, the horizontally extending wing portion 10 being arranged against the bottom of the groove 13. Retainer member 8 includes an outwardly directed horizontal portion 8' and an offset vertical portion 15 that protrudes beyond the groove 13. The end of this other portion 15 constitutes a stop for the exterior face 6 of the panel means 2 with respect to the exterior rim of the groove. The configuration of retainer members 8 and 9 is shown clearly in FIGS. 1 and 2.

Retainer member 9, like retainer member 8, includes an inwardly directed inclined portion 9' and an offset vertical portion 16 that protrudes beyond groove 13 and defines a stop for the internal face 7 of the panel means. By virtue of the lateral displacement of the stop 15 toward the external medium E and because the thickness of the panel means 2 is essentially equal to the width of the groove 13, sufficient leeway J exists between the face 7 of the panel means and the inside rim of the groove 13 so as to permit the introduction into said groove of retainer member 9 after the panel means 2 has been placed against the retainer member 8.

Insulating wedges 17, preferably formed of an elastomer or similar material, are provided between the panel external and internal faces 6 and 7 and the retainer members 8 and 9, respectively, thereby preventing direct contact between the glass faces of the panel means and the metal faces of the retainer members.

The sealing joint 5 contains openings 18 (FIG. 2) for receiving the vertical stop portion 15 of the exterior retainer member 8. Seal means 5 includes a flexible upper portion 19 which can rest, on the one hand, against face 6 and, on the other hand, against support 3, which upper portion curves inwardly at its upper extremity 19' and forms a tight connection between said external face 6 of the panel means 2 and the support 3. The upper portion 19 is sufficiently wide to cover the stop portion 15 and to insulate the retainer members 8 and 9 from the external medium E.

The flexible upper extremity 19' includes at least one longitudinal groove 20 adjacent the vicinity of the zone of contact with the face 6. This groove 20 contains seal means 21, such as a layer of cement, designed to improve the tightness between the upper portion 19 and the face 6. If desired, one or more grooves similar to groove 20 may be provided in the horizontal lower extremity 19" of the upper portion 19 opposite the support 3 for receiving cement seal means (as shown in FIG. 4).

The seal means 5 includes a lower honeycombed portion 22 having a generally rectangular transverse cross-section (as shown in FIG. 2) designed to extend within the groove 13. The honeycombed portion 22 includes flexible lateral tongues 22a that cooperate with the vertical faces of groove 13 to guarantee the centering of the honeycombed portion 22 in said groove 13 and to assure the maintenance of seal means 5 upon assembly. The seal means 5 includes an intermediate portion 23 that connects the upper portion 19 to the honeycombed portion 22.

Auxiliary mounting members 24, which preferably comprise a plurality of metallic elements in the form of a reverse U, are placed in the bottom of the horizontal groove 13 to support the mass 2. Notches (not shown) are provided in the honeycombed portion 22 for the placement of these mounting members 24. The intermediate portion 23 of the seal means 5 preferably passes between these mounting members 24 and the rim of mass 2 and thus serves as a flexible wedge for the panel means 2.

Air chambers 25 (FIGS. 1 and 2) are provided between the lower extremity 19" of the upper portion 19 and the support 3 which, in a known manner, oppose the phenomena of capillarity especially when the support is smooth. When the support comprises concrete, a supplementary sealing effect is achieved by means of a product such as cement that is introduced between the seal means 5 and the concrete surface of the support 3, thereby preventing the infiltration of humidity through capillarity. The attaching means 1 preferably includes a cover element 26 made of elastomer or synthetic plastic material designed to support itself against the internal face 7 of the panel means 2 and support 3. This element is essentially symmetrical relative to the upper portion 19 with respect to a vertical plane equidistant from faces 6 and 7 of the panel means. As shown in FIGS. 1 and 2, this element 26 may be independent of seal means 5 and may involve include a flange 27 equipped with tongues 27' guaranteeing the blocking of this element 26 in groove 13, against the honeycombed portion 22 of seal means 5.

Element 26 serves as a decorative facing and also establishes a tight seal between face 7 and support 3. Furthermore, when the panel means 2 is a mirror on the facade of a building and when support 3 is made of unfinished concrete, the upper part 19 of the seal means 5, by covering the coldest outside portion of the concrete, will thermally insulate the air of the interior medium I from the cold support 3. Water condensation of this support zone 3 can thus be avoided.

The number of retainer members 8 and 9, their dimensions, and their stop surfaces for panel means 2 are naturally calculated as a function of the mechanical stresses upon the panel means, as well as the mechanical resistance, the weight, and the dimensions of the latter.

Preferably one or more openings 28 (FIG. 1) are provided on the face of the honeycombed portion 22 directed toward the internal medium I to facilitate the introduction of the retainer member 9 between the seal means 5 and the inside wall of groove 13.

To attach the panel means 2 with the aid of the attaching means 1, for example, in an embrasure situated on the facade of a building and in the wall of which a groove 13 has been made, the installation proceeds as follows (reference being made to the illustration of FIG. 5).

At several points P, in the interior of the building, the retainer members 8 are attached in the grooves 13, whereupon support elements 24 are introduced into the grooves as shown in FIG. 2. The lower honeycombed portion 22 of seal means 5 is then inserted in the grooves by passing the stop portion 15 of retainer member 8 through the openings 18.

A strip of cement is then inserted in the groove 20, and the outside wedge 17 is mounted in place. The panel means 2 is then arranged in such a manner that its outside rim will be supported against the stop portion 15 with face 6 pushing against the upper extremity 19' of the upper portion 19. As a result we can assure the proper placement of panel means 2 when the inside rim of the intermediate portion 23 occupies the position provided for with respect to the face 7. During the placement of panel means 2, as a result of the inclination of upper portion 19, the cement strip 21 can flow only toward the retainer member 8 beneath the upper portion 19. Thus the exterior presentation of the panel means is clean and unobstructed since the cement 21 does not protrude beyond the visible portion of external face 6. There is therefore no need to clean this face in the vicinity of band 19. Such a cleaning could be performed only from the outside which would not be practical and which, most of the time, would require scaffolding.

The interior retainer members 9 are then introduced into openings 28 (FIG. 1) and undergo lateral displacement parallel to the longitudinal axis of the groove so that wing 11 of each inner retainer member 9 slides between wing 10 of the corresponding outer retainer member 8 and the bottom of the groove 13. The interior wedges 17 are arranged between retainer members 9 and the internal face 7 of the panel means.

Finally cover element 26 is mounted in place by introducing the flange 27 into groove 13 and by effecting its connection upon the portion 22 of seal means 5, as shown in FIG. 2.

It is important to note that all of these assembly operations are performed from the inside, which is particularly advantageous in the case of multi-stored buildings.

FIGS. 3 and 4 show various modifications of the attachment means according to the invention. The elements of FIGS. 3 and 4 that are similar to those in FIGS. 1 and 2 are designated by the same reference figures, followed, respectively, by the letters "a" and "b".

In FIG. 3 it is noted that the configuration of the support 3a, which is preferably formed of metal (for example, aluminum), includes in addition to groove 13a a pair of further grooves 29 and 30 that cooperate with flange 22a of seal means 5a (similar to the honeycombed portion 22 of seal means 5) and flange 27a of covering element 26a, respectively. Retainer members 8a and 9a are held by groove 13a against movement only in a direction perpendicular to the faces 6a, 7a, of panel means 2a.

The two retainer members 8a and 9a are staggered with respect to each other according to the central longitudinal direction of the groove 13a and, as shown in FIG. 3, the retainer member 9a is behind retainer member 8a. Coming out of groove 13a, the latter passes above the end of seal means 5a, which is turned toward the internal medium I, so that a flexible wedge 31 must be provided between retainer member 8a and panel means 2a. Retainer member 8a includes a horizontal bridging portion 8a' which extends from face 6a to face 7a of the panel means so that the members 8a, situated in the bottom of horizontal groove 13a, serve as support for the panel means 2a.

Again the assembly is accomplished from the inside; however seal means 5a must be put in place before the retainer members 8 and 9.

According to the modification shown in FIG. 4, the cover element 26b is an integral part of seal means 5b, said element 26b, as well as its junction on the intermediate portion 23b, being sufficiently flexible to permit the folding back of said element 26b toward the support 3b and the placement of mass 2b against panel means 26 against retainer element 8b.

In addition to groove 13b, identical to groove 13a in FIG. 3, a second parallel groove 29b, situated toward the outside with respect to groove 13b, is provided to receive the honeycombed portion 22b of seal means 5b.

The arrangement of retainer elements 8b, 9b in groove 13b and with respect to panel means 2b is identical to that of the retainer elements 8a, 9a, of FIG. 3. It should be noted that openings 18b are provided in the intermediate portion 23b for the passage of the retainer members 8b and 9b.

A cement strip 21b is also provided between seal means 5b and support 3b.

Regardless of the manner of implementation adopted, there is obtained in accordance with the present invention a device for the fixation of a panel which offers the following advantages.

The entire assembly of the device and of the panel means may be accomplished from the side of internal medium I (that is, in the case of a building and a panel on the facade, from the interior of the building).

The sealing effect achieved here is very good and with a single seal means there can directly be provided a tight seal between panel means 2 and support 3 by insulating the mechanical retention means 4.

The placement operations are simple and the mechanical stability of the panel means is excellent. The possible vibrations of the mechanical means 2, due to mechanical stresses, are limited by retaining members 8a, 8b, 9, 9a, 9b, and tightness is preserved. If desired, a certain rigidity may be provided for the upper portions 19, 19a, 19b and for the covering elements 26, 26a, 26b.

In this case, for the lower stories, the sealing joint alone can guarantee the retention of the panel means in the conventional manner. For a building with many stories identical grooves may be provided for all of the openings on the facade, but in the lower stories, one need use only the sealing joint 5, whereas for the upper stories, where the masses are subjected to greater stresses due to the wind, the complete device with the retaining members must be utilized.

Moreover, when upper portion 19 and cover element 26 have sufficient rigidity, tight locking is assured over the outline of the panel means in such a manner that, in case the panel means should break, the pieces will be retained by seal means 5, the covering element 26, and the cement (which, sticking to panel means 2, likewise helps to retain the pieces in place).

In the case of a rectangular mass, for which we must guarantee tightness over the entire outline, seal means 5 advantageously constitutes a framework that can be adapted for mounting over the entire perimeter of the mass.

The number of retainer elements for such a rectangular mass may be eight, for example, two on each side of the mass. But it is obvious that this number may be any number whatsoever. It suffices to guarantee a total support surface for the mass, sufficient to meet the conditions imposed by the mechanical efforts and by the resistance of the materials.

Support 3 can be made of any material, such as concrete, stone, metal, wood, or the like. Attaching means may be provided for all kinds of inclinations of the panel means (in particular for horizontal panels separating levels).

Retainer members 8, 8a, 8b could be placed in a groove different from the one in which are placed the retainer members 9, 9a, 9b, said groove being situated essentially in the same plane as face 6, 6a, 6b of panel means 2, 2a, 2b.

It is obvious that the invention is by no means limited to those embodiments or modifications of the invention which have been specially indicated, nor to the manner of application of its various parts. On the contrary, it includes all variants, especially those in which the mechanical retaining means include members arranged on one side of the panel means (namely, on the outside, if said panel means is subjected primarily to depressions, or on the inside if said mass is subjected primarily to over-pressures), or those in which the number of outside retainer members differs from the number of inside members.

What is claimed is:

1. A panel mounting assembly, comprising
    a. a vertical support (3) containing a through opening the peripheral wall surface of which contains continuous groove means;
    b. a panel (2) mounted in said opening;
    c. means retaining said panel in said opening, including a plurality of pairs of rigid retainer members spaced around the periphery of said panel, said pair of retainer members including
        1. an outer member (8) the upper and lower end portions of which engage the outer face of said panel and extend within said groove means, respectively; and
        2. an inner member (9) the upper and lower end portions of which engage the inner face of said panel and extend within said groove means, respectively; and
    d. flexible outer seal means (5) for tightly sealing the peripheral joint between said panel and said support, and for covering and insulating said retainer members from the medium to which said external face is exposed, said outer seal means including
        1. an upper portion (19) in engagement with the outer face of said panel;
        2. a lower portion (22) that extends within said groove means generally beneath said panel; and
        3. an intermediate portion (23) connecting said upper and lower portions.

2. Apparatus as defined in claim 1, wherein the upper extremity (19') of the upper portion of said flexible outer seal means contains in the surface thereof in engagement with said panel outer face a groove (21), and further including a mass of sealing material (20) contained in said groove for sealing contact with said panel external face.

3. Apparatus as defined in claim 1, wherein the lower extremity (19'') of the upper portion of said seal means engages the outer surface of said support, whereby said upper portion of said seal means straddles the joint between said panel and said support.

4. Apparatus as defined in claim 3, wherein said groove means includes an auxiliary groove (29, 29b) parallel with, spaced from and arranged on the exterior side of said first groove, said lower portion of said outer seal member extending in sealed relation within said auxiliary groove.

5. Apparatus as defined in claim 3, wherein said upper and lower portions of said outer retainer member (8) are off-set, said outer retainer member including a generally horizontal intermediate portion (8') that extends at least partially below said panel, the lower end portions of said outer and inner retainer members being received in a common first groove (13).

6. Apparatus as defined in claim 5, wherein the lower portion of said outer seal means extends in sealed relation within said first groove.

7. Apparatus as defined in claim 6, and further including auxiliary mounting means (24) mounted in said first groove for supporting said panel in spaced relation above the bottom wall of said groove.

8. Apparatus as defined in claim 5, and further including an inner cover member (26) having an upper portion for enclosing said retaining means and for sealing the joint between the inner face of said panel and said support, said inner cover member including a lower portion that extends within said groove means.

9. Apparatus as defined in claim 8, wherein said outer and inner seal members are integral.

* * * * *